United States Patent [19]
Kniss

[11] Patent Number: 5,234,656
[45] Date of Patent: Aug. 10, 1993

[54] PROCESS AND DEVICE TO PREPARE A MIXTURE FOR USE IN MANUFACTURING PLASTIC MOULDED PARTS

[75] Inventor: Kurt Kniss, Biebergemünd, Fed. Rep. of Germany

[73] Assignee: JV Kunststoffwerk GmbH, Georgensgmünd, Fed. Rep. of Germany

[21] Appl. No.: 691,050

[22] PCT Filed: Dec. 22, 1989

[86] PCT No.: PCT/EP89/01599
§ 371 Date: Jun. 24, 1991
§ 102(e) Date: Jun. 24, 1991

[87] PCT Pub. No.: WO90/07412
PCT Pub. Date: Jul. 12, 1990

[30] Foreign Application Priority Data
Dec. 23, 1988 [DE] Fed. Rep. of Germany ....... 3843576

[51] Int. Cl.$^5$ ............ B29C 45/47; B29C 45/60; B29C 47/38
[52] U.S. Cl. ............ 264/328.18; 264/211.23; 425/205; 425/208; 425/587; 366/76; 366/81; 366/82; 366/89
[58] Field of Search ............ 264/328.18, 328.17, 264/37, 211.23, 319, 320; 425/205, 582, 587, 208; 366/76, 81, 82, 87, 89, 91, 134, 159

[56] References Cited

U.S. PATENT DOCUMENTS
3,392,962  7/1968  Fritsch et al. .
4,124,307  11/1978  Anisic .................... 366/76
4,541,982  9/1985  Upmeier .

FOREIGN PATENT DOCUMENTS
0118847  9/1984  European Pat. Off. .
 134615  3/1979  Fed. Rep. of Germany .
3150757  7/1982  Fed. Rep. of Germany .
3233416  5/1984  Fed. Rep. of Germany .
 233270  2/1986  Fed. Rep. of Germany .
3138857  2/1986  Fed. Rep. of Germany .
3138858  2/1986  Fed. Rep. of Germany .
1463687  2/1977  United Kingdom .
2012659  8/1979  United Kingdom .

Primary Examiner—Jill L. Heitbrink
Attorney, Agent, or Firm—Wenderoth, Lind & Ponack

[57] ABSTRACT

In a process for the manufacture of thick, preferably sheet-shaped, thermoplastic molded parts or molded parts having areas of variable cross sections, at least one part of the plastic material is conveyed as a melt into a heatable and optionally coolable compression mold and is subsequently compressed. Plastic granules are mixed in with the melt before the melt is conveyed into a compression mold. A device to prepare such mixture of melt and plastic granules includes a first section designed as a melt extruder and a subsequent section designed as a mixing extruder. The granules can be fed into the melt between both extruder sections or into the second section.

27 Claims, 1 Drawing Sheet

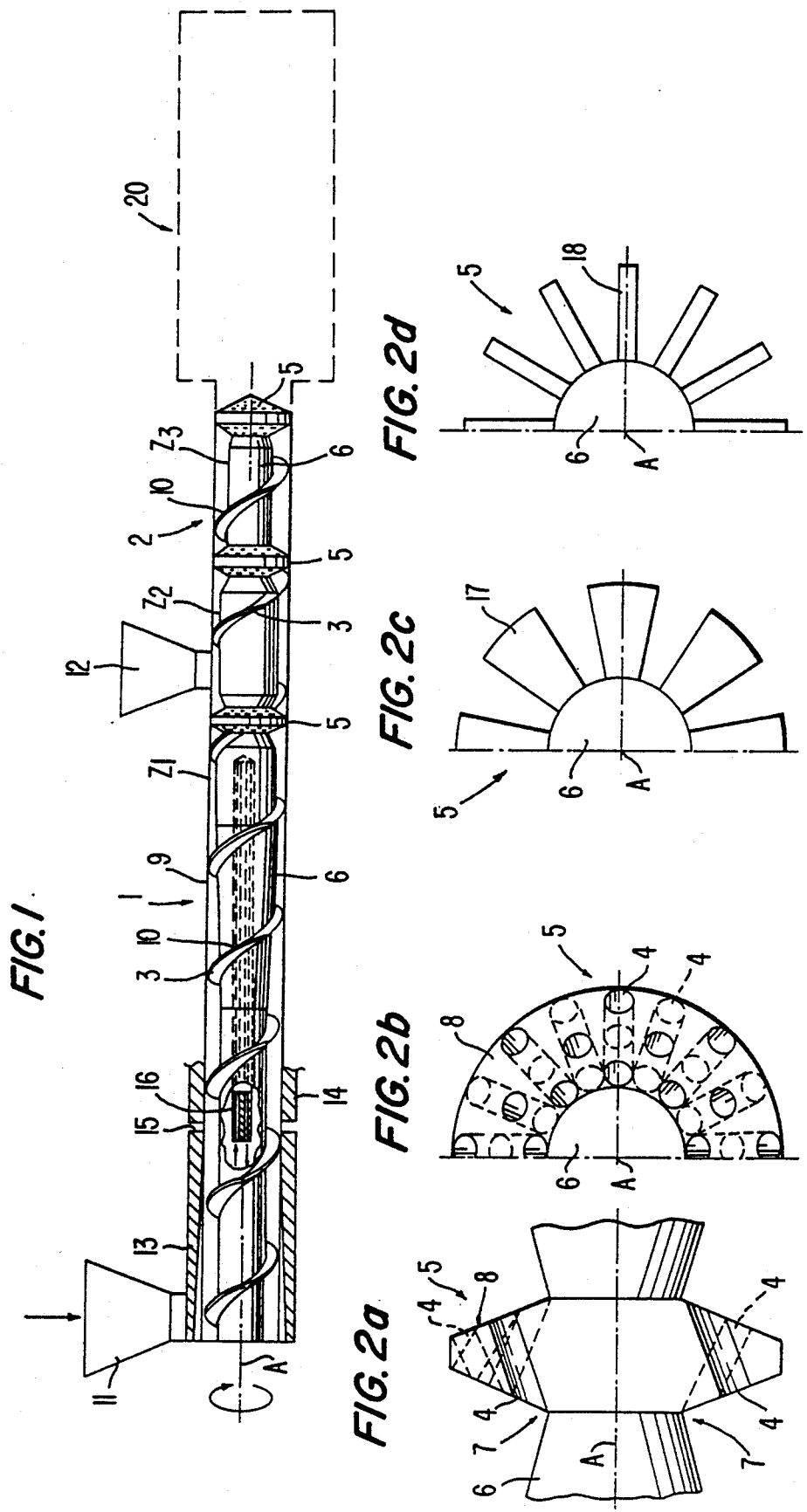

PROCESS AND DEVICE TO PREPARE A MIXTURE FOR USE IN MANUFACTURING PLASTIC MOULDED PARTS

BACKGROUND OF THE INVENTION

The invention relates to a process involved in the manufacture of thick, preferably sheet-shaped, thermoplastic molded parts or molded parts having areas of variable cross sections, wherein at least one part of a plastic material is to be conveyed as a melt or molten material into a heatable and optionally coolable mold, e.g. a compression mold or an injection mold, and therein is compressed or injection molded.

Such a process is of interest especially for the manufacture of a chamber and diaphragm filter plate which includes a thick-walled edge and a significantly thinner inner area. This shape of chamber and diaphragm filter plates is necessary for use in so-called filter presses, since the filter chambers of such filter presses are formed by depressions in the individual filter plates when the plates are clamped together, arranged in a row with their edges lying side-by-side, into a mold plate assembly. In so doing, the significantly thicker edges of the plates serves as a sealing surface to prevent suspensions, which are pressed into the filter chamber and are to be filtered, from escaping.

The manufacture of such thick molded parts, especially those having variable thickness, causes problems because, while cooling in the mold following the manufacture from molten plastic, voids, sink marks in the surface and stresses that can lead even to crack formation form due to the large, especially varying material thickness. Therefore, cooling in the compression mold must be conducted very slowly and carefully under constant molding pressure, a process that is not only very time consuming, but also that requires that the compression mold be occupied for such period of time.

To manufacture such molded parts of variable cross section with largely homogeneous material joints without the formation of voids, a process a proposed in DE 31 38 858 C3 in which a preform is inserted as a two-sided flat plate into the open compression mold. Then the compression mold is closed and the preform is forced to close under heat and pressure, wherein in a first phase little pressure is applied to the preform in order to melt the preform on both sides by means of the heated compression mold. Then in a second phase that is temporally adjusted to the melting process of the surface of the preform, the distance between upper and bottom parts of the compression mold is increasingly reduced by increasing the pressure. The material melted from both surfaces of the sheet-shaped preform is forced into peripheral areas by means of the pressure of the compression mold and finally fills out the entire peripheral area. This type of manufacture requires much time and technical experience and does not exclude with certainty the formation of voids, sink marks in the surface of the finished molded part, and stresses that form and can lead to the formation of cracks.

A process known from DE 31 38 857 has the same goal of manufacturing molded parts with homogeneous material joints without the formation of voids. In this process, a pre-finished partial molding, namely a frame forming a finished edge, and supporting cams in a plate area, are inserted into the compression mold. The cams are intended for the mutual support of the filter plates in the mold plate assembly. Subsequently, other cavities remaining in the compression mold are filled with plastic granules and then compressed with the pre-finished frame forming the edge and the supporting cams while the compression mold is heated. With this process the finished molded part is supported to shrink everywhere by the same amount when cooling. Apart from the fact that the process is relatively time consuming and expensive, stresses and fractures, especially in the area of transition from the plate to the supporting cam and to the peripheral area, cannot be ruled out with certainty.

SUMMARY OF THE INVENTION

The object of the present invention is to provide a device and a process enabling finished molded parts to be manufactured rapidly and reliably without the drawbacks described above.

This problem is achieved according to the invention in that before the melt is conveyed into a compression mold, granules of the plastic material are added to the melt. Thus, several advantages are obtained simultaneously. Since only a portion of the plastic material has to be transferred in the molten state, whereas the other portion is added as granules, only a relatively small amount of energy is necessary to manufacture the mixture of melt and granules. By adding granules to the melt, the temperature of the plastic mixture is already lowered before the melt is conveyed into the mold so that the finished molded part can also be cooled faster in the mold.

An especially flawless homogeneous structure of the molded part is obtained if, when adding the granules, the melt and the granules have a temperature that results in only the surface of the added granules melting. Suitable variations of the ratio of quantities of material and/or the granule size can serve to adjust and control the desired temperature conditions. In this manner, on the one hand the granules are embedded flawlessly and without the risk of cracks forming the curing melt, whereas on the other hand the core areas of the granules that remain cold provide that the finished molded part cools faster. The finished molded part is thus not only cooled from the outside in the coolable mold but also somewhat from the inside out.

Another special feature of the invention is the fact that, when ready to be conveyed into the mold, the mixture comprising melt and granules has a temperature that is slightly above the crystallization temperature or has a temperature in the partial crystalline temperature range of the plastic material of the melt. With this procedure energy can be saved when the finished molded part is rapidly cooled in the, for example, cooled mold, so that a higher output can be achieved.

The mixture comprising melt and granules is manufactured preferably with an extruder or an injection molding machine prior to being fed to the mold. In this manner the process of the invention can be carried out with relatively little equipment cost. It is especially economical if the melt is prepared in a first section of the extruder or the injection molding machine, and melt and granules are mixed in a second section and the granules are added between the two sections or in the second section.

When using polypropylene as the plastic material, which is especially suitable for the manufacture of filter plates, it is proposed with the invention that the melt be raised to approximately 180° C. to 250° C. and that the granules be added at room temperature to the melt.

Thus, it is only necessary to generate energy to melt a portion of the plastic material, whereas a high amount of energy for entirely melting the granules is not required. However, it is also possible to vary both temperatures in order to set an optimal condition. Thus, it is possible also to preheat the granules in order to achieve, for example, that at a lower melting temperature the surface layer of the granules just barely melts when the granules are added into the melt. For other plastics the temperatures can be suitably adapted without further effort.

The process of the invention also offers the advantage that fillers such as chalk or the like can be added to the melt, when molded parts or areas of molded parts or preforms can be made of a material of lower quality, such molded parts or areas of molded parts or preforms being then jacketed with a plastic layer of higher quality.

The invention also relates to a device to prepare a mixture comprising a melt and plastic granules that are especially suitable for carrying out the process of the invention described above. The device includes a first section designed as a melt extruder and a subsequent section designed, e.g. as a melt extruder with additional mixing properties. The granules are fed into the melt between the two sections or into the second section. Such a device is simple to build and to operate and results in the melt and granules being reliably mixed homogeneously, and is suitable in particular for manufacturing molded parts of homogeneous structure.

Conventional extruders, in which the melt is thoroughly mixed to a degree due to the special shape of screw channels of the extruder screw, are unsuitable within the scope of the invention, where a melt is supposed to be mixed with granules. Therefore, it is proposed with the invention that the melt extruder with additional mixing properties has one or more mixing elements that also achieve, e.g. a conveying action, that can also be rotated preferably with a screw of the extruder, and that have the shape preferably of a disk with openings, lamellae or pins. In this manner the melt and the granules are automatically mixed. Also, spaced over the length of the melt extruder with additional mixing properties, several of such or identical mixing elements can be provided. The disk shape of the mixing elements guarantees small space requirements. Also, when the mixing elements can be rotated with the extruder screw itself, a separate drive is unnecessary. Preferably, a delivery end of the extruder screw is also designed as such a mixing element.

An especially optimal mixing of the melt and granules is obtained if, according to a special embodiment of the invention, the mixing elements of the mixing sections are arranged in depressions of the extruder shaft and have substantially a trapezoidal axial cross section. In this manner an uninterrupted flow of material through the mixing elements is guaranteed. The mixing effect is still further increased if the openings are positioned, preferably alternatingly, to be sloped relative to the axis of the extruder. This effect is intensified even more if one part of the openings, as seen in the conveying direction, slopes from radially inwardly to radially outwardly and another part slopes from radially outwardly to radially inwardly. In this manner the hot melt is reliably mixed, e.g. in the area of an outer heated cylinder of the extruder and the colder melt is reliably mixed in the core area of the screw channel, so that a temperature equalization in the mixture is guaranteed.

Furthermore, it is especially advantageous if in the area of the first melt extruder the plastic material is preferably progressively compressed in the conveying direction and is decompressed in the area of the melt extruder with additional mixing properties. Thus, on the one hand the result is that air drawn in with the plastic compound at a material feed of the melt extruder is forced out again through the material feed, whereas due to the decompression in the mixing extruder an intensive addition of granules is promoted.

To obtain desired decompression following the first melt extruder, it is also proposed with the invention that the diameter of the extruder shaft in the section of the mixing extruder be smaller than in the end section of the melt extruder. Thus, the diameter of the extruder shaft can decrease once again or several times, e.g. step-wise, in the area of the melt extruder with additional mixing properties.

For a reliable manufacture of the desired melt it is advantageous if the extruder screw and/or the extruder cylinder can be heated or cooled, in any case in the area of the first melt extruder.

To take different heat transfers into account, it is especially advantageous in order to obtain a homogeneous melt if the surface temperature of the extruder screw can be controlled in such a manner as a function of the temperature of the extruder cylinder that in any case in the section of the first melt extruder the former is approximately 15° to 20° above the latter.

BRIEF DESCRIPTION OF THE DRAWINGS

Other objects, features, advantages, and possible applications of the present invention will be apparent from the following description of embodiments thereof, with reference to the accompanying drawings, wherein all described and/or illustrated features form individually or in any logical combination the subject matter of the present invention, and wherein:

FIG. 1 is a schematic vertical sectional view of a device designed as an extruder according to the invention in order to prepare a mixture of a melt and granules;

FIGS. 2a and 2b respectively are side and end views, shown partially broken away, of a mixing element of the invention and its arrangement on an extruder shaft; and FIGS. 2c and 2d are schematic views, shown partially broken away, of two other mixing elements according to the invention.

DETAILED DESCRIPTION OF THE INVENTION

The device shown in the drawings is used to manufacture a mixture that comprises a melt and plastic granules and is used in particular in the manufacture of thick, preferably sheet-shaped molded parts or molded parts with areas whose cross section vary in thickness. In such process at least one part of the plastic material is conveyed as a melt into a heatable and optionally coolable mold (shown schematically at 20) and is compressed or injection molded. The device is designed, according to FIG. 1, as an extruder, to which the plastic material for the manufacture of melt is fed by means of a feed funnel 11 and to which the granules to be added are fed by means of a feed funnel 12 with a granule pump. Feed funnel 11 is attached to a stationary input sleeve 13 that opens into a heatable extruder cylinder 9. Extruder cylinder 9 is received in a bearing sleeve 14, which is separated by means of a thermal separation 15, e.g. an air gap, from the input sleeve 13. A first section of the extruder is designed as melt extruder 1, and a subsequent section of the extruder is designed as melt extruder 2 with mixing properties, i.e. as a mixing extruder. Feed funnel 12 for the granules is provided in the illustrated case in the upstream or starting region of melt extruder 2.

For the purpose of manufacturing the melt, within extruder cylinder 9 is an extruder screw 3 that is heated, and in particular in the illustrated case by means of a hot fluid which is guided, as indicated with arrows, in cylindrical bores 16 arranged in an extruder shaft 6, or in lines housed in such bores. Extruder cylinder 9 has over its length in essence the same inner cross section, whereas the diameter of the extruder shaft 6 in the heated section of the melt extruder 1 increases in the conveying direction, so that the gap between extruder shaft 6 and the inner wall surface of the extruder cylinder 9 decreases. In this manner, when conveying the melt by driving the extruder shaft 6, the melt is gradually compressed while being conveyed along a screw channel 10 due to the cross section of the shaft expanding gradually. As a result, air dragged or drawn into the extruder with the plastic compound through the feed funnel is forced out again via the feed funnel 11. Thus, the melt is conveyed into the second melt extruder 2 in a degasified state.

As is apparent from FIG. 1, the cross section of extruder shaft 6 is somewhat less in the area of chamber Z2 than in chamber Z1 in the downstream end area of the first melt extruder 1, thus resulting in decompression of the melt. In this area the granules are fed by the granule pump through the feed funnel 12. In the area of a chamber Z3 just before the downstream end of the second melt extruder 2, the cross section of the extruder shaft 6 once again is decreased slightly for further decompression, so that very little heat from friction is produced.

Shaft 6 has frusto-conical recesses or depressions 7 in the area of transition from melt extruder 1 to melt extruder 2 and in the area of approximately the center of the melt extruder 2. In or on the extruder shaft 6, at depressions 7, are provided disk-shaped mixing elements 5 that can be rotated with the extruder screw 3 and that are provided with openings 4 (the shape of which can be clearly discerned from FIGS. 2a and 2b). Each respective mixing element 5 has a mixing segment 8 having a cross section of trapezoid shape projecting into the respective depression 7 as far as directly into the vicinity of the inner wall surface of the extruder cylinder 9. Mixing sections 8 have openings 4 that are, as is apparent from FIGS. 2a and 2b, distributed over the entire feed surface of the mixing segments 8 and that are, seen in the conveying direction of the extruder, sloped in part from radially inwardly to radially outwardly and in part from radially outwardly to radially inwardly. Therefore, in respective mixing zones formed by the depressions 7 the hot melt is transferred from the cylinder wall towards the inside and the colder melt from the core area of the screw channel to the outside. Thus, an intensive thorough mixing and equalization of the temperature of the melt with the granules takes place. This mixing effect is promoted by the respective expansion of chamber Z2 with respect to chamber Z1 and of chamber Z3 with respect to chamber Z2. Mixing elements 5 also can be fitted with lamellae 17 (FIG. 2c) or pins 18 (FIG. 2d) distributed over the circumference of extruder shaft 6.

Another mixing element 5 is provided at the delivery end of the extruder screw 3. From there the intensively mixed mixture comprising melt and granules is conveyed directly into a mold. A delivery nozzle can also be provided that is designed preferably flat, so that the "cold melt", i.e. the mixture that comprises melt and granules and has a final temperature slightly above the crystallization temperature of the plastic, can be introduced as a web into the mold. Thus, a specific suitable pre-distribution of the melt-granule-mixture in this form can be achieved. In the subsequent compression operation the "cold melt" is distributed in the press interior and finally fills it totally in the heated form.

The temperatures of the melt and the granules are adjusted in such a manner with respect to one another that the granules in the mixture are melted only on the surface of the granules, whereas the core areas of the granules are still solid and relatively cold. At the completion of the compression operation and the subsequent necessary cooling, for example in the compression mold, which can be cooled for this purpose, a temperature equalization between the relatively cold core areas of the granules and the melt enclosing such core areas takes place. This results in the molded parts cooling and curing relatively rapidly without the risk of non-homogeneous structures being produced, because a continuous transition from the molten granule particles to the melt has been created. In this manner a molded part of high homogeneity is obtained, even if the molded part is relatively thick and has cross sections of varying thickness.

I claim:

1. In a process for the manufacture of thick sheet-shaped molded parts or molded parts of varying cross sections, said process including providing a molten thermoplastic material, conveying said molten material into a compression or injection mold and therein compression or injection molding said material while cooling or heating said material, thereby forming said molded part, the improvement comprising:
    prior to conveying said molten material into said mold, adding non-molten granules of said thermoplastic material to said molten material to thereby form a mixture of molten material and non-molten granules; and
    then introducing said mixture of molten material and non-molten granules into said mold and performing said molding operation to form said molded part.

2. The improvement claimed in claim 1, wherein said molten material and said granules have temperatures such that when said granules are added to said molten material only surface portions of said granules will melt.

3. The improvement claimed in claim 1, wherein said mixture has a temperature, when conveyed into said mold, slightly above the crystallization temperature of said thermoplastic material.

4. The improvement claimed in claim 1, wherein said mixture has a temperature, when conveying into said mold, in the partial crystalline temperature range of said thermoplastic material.

5. The improvement claimed in claim 1, comprising forming said molten material and adding said granules to said molten material in an extruder or an injection molding machine, and feeding said mixture therefrom into said mold.

6. The improvement claimed in claim 5, comprising forming said molten material in a first section of said extruder or said injection molding machine, and mixing said molten material and said granules to form said mixture in a second section of said extruder or said injection molding machine.

7. The improvement claimed in claim 1, wherein said thermoplastic material is polypropylene, said molten material is raised to a temperature of approximately 180° C. to 250° C., and said granules are added to said molten material at a lower temperature.

8. The improvement claimed in claim 7, wherein said lower temperature is room temperature.

9. The improvement claimed in claim 1, further comprising adding a filler material to said molten material.

10. In an apparatus for the manufacture of thick sheet-shaped molded parts or molded parts of varying cross sections, said apparatus including a compression or injection mold capable of being heated or cooled, and means for providing a molten thermoplastic material and conveying the molten material into said mold, whereby said mold is operable to form the molten material into a molded part, the improvement comprising:
   said means including first and second sections;
   said first section including means for forming the molten material;
   means for introducing non-molten thermoplastic granules into the molten material at a position between said first and second sections or into said second section;
   said second section including means for mixing the molten material and the granules to form a mixture thereof; and
   means for conveying the mixture of molten material and non-molten granules from said second section into said mold.

11. The improvement claimed in claim 10, wherein said means including said first and second sections comprises an extruder.

12. The improvement claimed in claim 11, wherein said mixing means comprises at least one mixing element mounted for rotation in said extruder.

13. An apparatus as claimed in claim 12, comprising plural said mixing elements.

14. The improvement claimed in claim 12, wherein said extruder includes an internal rotatable shaft having an extruder screw for conveying the material.

15. The improvement claimed in claim 14, wherein said mixing element is mounted on said shaft for rotation therewith.

16. The improvement claimed in claim 15, wherein said mixing element comprises a plurality of pins extending radially outwardly from said shaft.

17. The improvement claimed in claim 15, wherein said mixing element comprises a plurality of lamellae extending radially outwardly from said shaft.

18. The improvement claimed in claim 15, wherein said mixing element comprises a disk extending radially outwardly from said shaft and having a plurality of openings.

19. The improvement claimed in claim 18, wherein said openings extend through said disk in directions inclined to an axis of said shaft.

20. The improvement claimed in claim 19, wherein alternate of said opening incline oppositely.

21. The improvement claimed in claim 18, wherein first of said opening incline radially outwardly relative to a direction of conveyance, and second of said openings incline radially inwardly relative to said direction.

22. The improvement claimed in claim 18, wherein said disk is positioned in an annular recess formed in said shaft and has substantially a trapezoidal axial cross section.

23. The improvement claimed in claim 14, wherein said first section is constructed to progressively compress material during conveyance thereof in a conveying direction, and said second section is constructed to decompress the material.

24. The improvement claimed in claim 23, wherein said shaft in said first section has a diameter that progressively increases in said direction.

25. The improvement claimed in claim 23, wherein said shaft has a diameter in said second section that is smaller than in an axial end portion of said first section.

26. The improvement claimed in claim 14, wherein said extruder includes an outer cylinder coaxially surrounding said shaft, and further comprising means for heating or cooling at least one of said cylinder and said screw at least in said first section.

27. The improvement claimed in claim 26, wherein said heating or cooling means comprises means for controlling the temperature of said screw to be approximately 15°–20° C. above the temperature of said cylinder in said first section.

* * * * *